United States Patent Office 2,735,847
Patented Feb. 21, 1956

2,735,847

POLYMETHYLENEIMINOETHYL ESTERS OF DIPHENYLACETIC AND BENZILIC ACIDS, SALTS THEREOF AND PREPARATION THEREOF

Frederick F. Blicke, Ann Arbor, Mich., assignor to Regents of The University of Michigan, Ann Arbor, Mich., a corporation of Michigan No Drawing. Application April 6, 1954,
Serial No. 421,418

13 Claims. (Cl. 260—239)

This invention relates to new basic esters having the formula

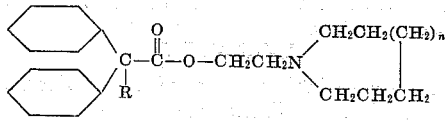

wherein R is selected from the group consisting of hydrogen and hydroxy, and $n$ is an integer from 1 to 3; and to water-soluble, non-toxic salts thereof. The invention also relates to a process for the preparation of these new substances.

My new compounds possess useful pharmacodynamic properties and in particular exhibit antispasmodic activity.

The esters of the invention are prepared by one of the following methods:

(1) The acid $(C_6H_5)_2CR$—COOH is heated with $\beta$-(1-hexamethylenimino)ethanol, $\beta$-(1-heptamethylenimino)ethanol or $\beta$-(1-octamethylenimino)ethanol in the presence of a mineral acid, such as sulfuric acid, as a catalyst, present in an amount greater than that necessary to neutralize the amino alcohol. The sulfate or bisulfate salt of the basic ester is formed, and the free basic ester can be obtained by addition of a strong base to the reaction mixture.

(2) The acid $(C_6H_5)_2CR$—COOH is heated with a $\beta$-(1-hexamethylenimino)ethyl halide, a $\beta$-(1-heptamethylenimino)ethyl halide or a $\beta$-(1-octamethylenimino)ethyl halide, where the halogen atom is chlorine or bromine. A hydrohalide of the basic ester is obtained which can be converted to the free basic ester by the addition of a strong base to the reaction mixture.

(3) A metallic salt of the acid $(C_6H_5)_2CR$—COOH is heated or simply mixed with a $\beta$-(1-hexamethylenimino)-ethyl halide, $\beta$-(1-heptamethylenimino)ethyl halide or $\beta$-(1-octamethylenimino)ethyl halide. In this case the free basic ester is formed directly.

(4) Diphenylacetyl chloride or diphenylacetyl bromide is reacted with $\beta$-(1-hexamethylenimino)ethanol, $\beta$-(1-heptamethylenimino)ethanol or $\beta$-(1-octamethylenimino)ethanol, giving a hydrohalide of a basic ester of the above structural formula where R is hydrogen.

The intermediate $\beta$-(1-hexa-, $\beta$-(1-hepta- and $\beta$-(1-octamethylenimino)ethanols are readily prepared by reacting hexamethylenimine, heptamethylenimine or octamethylenimine with ethylene chlorohydrin. The $\beta$-(1-hexamethylenimino)ethyl halides, $\beta$-(1-heptamethylenimino)ethyl halides and $\beta$-(1-octamethylenimino)ethyl halides are prepared by treatment of the corresponding alcohols with thionyl chloride or thionyl bromide.

These new basic esters are most conveniently used in the form of water-soluble, non-toxic acid-addition or quaternary ammonium salts and these salts are within the purview of the invention. The acids which can be used to prepare acid-addition salts are preferably those which produce when combined with the free base, salts whose anions are relatively innocuous to the animal organism in therapeutic doses of the salts, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively. The quaternary ammonium salts are obtained by the addition to the free base of alkyl or aralkyl esters of inorganic acids or organic sulfonic acids, including such compounds as methyl chloride, methyl bromide, methyl iodide, ethyl bromide, propyl bromide, benzyl chloride, benzyl bromide, methyl sulfate, methyl benzenesulfonate, and methyl p-toluenesulfonate, giving the methochloride, methobromide, methiodide, ethobromide, propobromide, benzochloride, benzobromide, methosulfate, methobenzenesulfonate and metho-p-toluenesulfonate salts, respectively.

The following examples will further illustrate the invention.

EXAMPLE 1

(a) $\beta$-(1-hexamethylenimino)ethanol

A solution of 119 g. (1.2 moles) of hexamethylenimine in 100 cc. of benzene was placed in a 500 cc. three-necked flask equipped with a stirrer, dropping funnel and a condenser fitted with a soda-lime tube. The stirred solution was heated on a steam bath and 40.3 g. (0.5 mole) of ethylene chlorohydrin was slowly added. The mixture was refluxed for sixteen hours, cooled and shaken with 25 g. of sodium hydroxide dissolved in 75 cc. of water. The organic layer was separated and washed with 75 cc. of water, after which the aqueous layers were combined and extracted with ether. The combined organic layer and ether extract was dried over anhydrous magnesium sulfate and distilled through a 15 cm. Vigreux column. After the excess starting material ( 51 g. of hexamethylenimine) had distilled, 65.5 g. (91.5%) of $\beta$-(1-hexamethylenimino)ethanol was collected, B. P. 111° C. (23 mm.).

(b) $\beta$-(1-hexamethylenimino)ethyl chloride hydrochloride

A solution of 41.5 g. (0.35 mole) of thionyl chloride in 25 cc. of benzene was stirred, and 40.0 g. (0.28 mole) of $\beta$-(1-hexamethylenimino)ethanol dissolved in 25 cc. of benzene was added dropwise. The mixture was refluxed for three hours, cooled, and the solid product was collected by filtration and washed with benzene, giving 50.8 g. (91.5%) of $\beta$-(1-hexamethylenimino)ethyl chloride hydrochloride, M. P. 208–209° C. after recrystallization from isopropyl alcohol using charcoal for decolorizing purposes.

Anal.—Calcd. for $C_8H_{17}NCl_2$: N, 7.07; Cl, 35.79. Found: N, 7.03; Cl, 35.60.

(c) $\beta$-(1-hexamethylenimino)ethyl diphenylacetate hydrochloride $\beta$-(1-hexamethylenimino)ethyl chloride hydrochloride (6.0 g., 0.03 mole) was placed in a separatory funnel and covered with ether. A cooled solution of 1.5 g. of sodium hydroxide in 25 cc. of water was then added. The mixture was shaken, and the aqueous layer was separated and extracted with ether. The combined ether layers were dried over anhydrous magnesium sulfate and then poured into a solution of 4.2 g. (0.02 mole) of diphenylacetic acid in 75 cc. of isopropyl alcohol. The solvent was then distilled through a 15 cm. Vigreux column until the temperature of the vapor reached 80° C. The column was replaced by a condenser and the solution was refluxed for ten hours. The solid material which separated from the solution when cooled was collected by filtration, giving 6.8 g. (91%) of β-(1-hexamethylenimino)ethyl diphenylacetate hydrochloride, M. P. 142–143° C. after recrystallization from isopropyl alcohol.

*Anal.*—Calcd. for $C_{22}H_{28}O_2NCl$: N, 3.69; Cl, 9.48. Found: N, 3.64; Cl, 9.49.

EXAMPLE 2

β-(1-hexamethylenimino)ethyl benzilate hydrochloride was prepared from 6.0 g. of β-(1-hexamethylenimino)-ethyl chloride hydrochloride and 4.5 g. of benzilic acid according to the manipulative procedure described above in Example 1, part (c). There was thus obtained 6.9 g. (88.5%) of β-(1-hexamethylenimino)ethyl benzilate hydrochloride, M. P. 159–161° C. after recrystallization from isopropyl alcohol.

*Anal.*—Calcd. for $C_{22}H_{28}O_3NCl$: N, 3.59; Cl, 9.09. Found: N, 3.62; Cl, 9.07.

EXAMPLE 3

(a) *β-(1-heptamethylenimino) ethyl diphenylacetate hydrochloride*

β-(1-heptamethylenimino)ethanol (7.9 g., prepared from heptamethylenimine by a method analogous to that described in Example 1, part (a)), dissolved in 10 cc. of benzene, was added dropwise to a stirred solution of 12.8 g. of diphenylacetyl chloride in 10 cc. of benzene. After the mixture had been refluxed for twelve hours, the solvent was removed by distillation, the residue was dissolved in a minimum amount of water, the cooled solution was made alkaline with sodium hydroxide solution and the product was extracted with ether. The extract was dried with anhydrous potassium carbonate, the solvent was removed and the ester distilled, giving 7.4 g. of β-(1-heptamethylenimino)ethyl diphenylacetate, B. P. 213–215° C. (1.2 mm.).

When the basic ester, dissolved in absolute ethanol, was treated with ethereal hydrogen chloride, the hydrochloride salt of β-(1-heptamethylenimino)ethyl diphenylacetate precipitated as an oil which became crystalline after it had been washed several times with ether. After recrystallization from an ethanol-ethyl acetate-ether mixture it had the M. P. 134.5–137° C.

*Anal.*—Calcd. for $C_{23}H_{29}NO_2.HCl$: C, 71.21; H, 7.80; N, 3.61; Cl, 9.14. Found: C, 71.54; H, 7.84; N, 3.62; Cl, 9.15.

(b) *β-(1-heptamethylenimino)ethyl diphenylacetate methobromide*

A 2.5 g. portion of β-(1-heptamethylenimino)ethyl diphenylacetate was dissolved in a mixture of methyl ethyl ketone and ether, and 2 cc. of methyl bromide was added. After standing for two days crystalline material had separated and this was collected by filtration, giving 2.2 g. of β-(1-heptamethylenimino)ethyl diphenylacetate methobromide, M. P. 155–159° C. after recrystallization from a methyl ethyl ketone-ether mixture.

*Anal.*—Calcd. for $C_{24}H_{32}BrNO_2$: C, 64.56; H, 7.23; N, 3.14; Br, 17.90. Found: C, 64.23; H, 7.62; N, 3.18; Br, 18.03.

EXAMPLE 4

(a) *β-(1-heptamethylenimino)ethyl benzilate hydrochloride*

A mixture of 10.6 g. of β-(1-heptamethylenimino)ethyl chloride hydrochloride (prepared from heptamethylenimine by a method analogous to that described in Example 1, parts (a) and (b)), 150 cc. of isopropyl chloride and 26.6 g. of potassium benzilate was stirred and refluxed for forty-eight hours and then filtered. The solvent was removed from the filtrate, the residue was dissolved in ether and the solution was treated with ethereal hydrogen chloride. The precipitated hydrochloride was recrystallized from an ethanol-ethyl acetate-ether mixture, giving 8.1 g. of β-(1-heptamethylenimino)ethyl benzilate hydrochloride, M. P. 172–175° C. (dec.).

*Anal.*—Calcd. for $C_{23}H_{29}NO_3.HCl$: C, 68.39; H, 7.49; N, 3.47; Cl, 8.78. Found: C, 68.50; H, 7.55; N, 3.56; Cl, 8.73.

(b) *β-(1-heptamethylenimino)ethyl benzilate methobromide*

A 4.0 g. portion of the hydrochloride salt of β-(1-heptamethylenimino)ethyl benzilate was converted into the free base and excess methyl bromide was added to an ethereal solution of the base. After standing for two days 2.5 g. of the methobromide salt of β-(1-heptamethylenimino)ethyl benzilate had precipitated; M. P. 179–180° C. (dec.) after recrystallization from an ethanol-ether-methyl ethyl ketone mixture.

*Anal.*—Calcd. for $C_{24}H_{32}BrNO_3$: C, 62.34; H, 6.98; N, 3.03; Br, 17.29. Found: C, 62.11; H, 7.08; N, 3.16; Br, 17.42.

EXAMPLE 5

(a) *β-(1-octamethylenimino)ethyl diphenylacetate hydrochloride*

β-(1-octamethylenimino)ethanol (10.4 g., prepared from octamethylenimine by a method analogous to that described in Example 1, part (a)), dissolved in 20 cc. of benzene, and a solution of 12.7 g. of diphenylacetyl chloride in 30 cc. of benzene were treated in the manner described above in Example 3, part (a). There was thus obtained 15.3 g. of β-(1-octamethylenimino)ethyl diphenylacetate, B. P. 195–198° C. (0.004 mm.). The free basic ester, dissolved in absolute ethanol, was treated with hydrogen chloride, giving the hydrochloride salt of β-(1-octamethylenimino)ethyl diphenylacetate, M. P. 117–119° C. after recrystallization from an ethanol-ethyl acetate-ether mixture.

*Anal.*—Calcd. for $C_{24}H_{31}NO_2.HCl$: C, 71.70; H, 8.03; N, 3.49; Cl, 8.82. Found: C, 71.50; H, 8.01; N, 3.52; Cl, 9.08.

(b) *β - (1 - octamethylenimino)ethyl diphenylacetate methobromide* was prepared by addition of excess methyl bromide to a solution of the basic ester dissolved in a mixture of methyl ethyl ketone and ether. After standing for ten days the precipitated methobromide was separated and recrystallized from methyl ethyl ketone and had the M. P. 133–134° C.

*Anal.*—Calcd. for $C_{25}H_{34}NO_2Br$: N, 3.05; Br, 17.36. Found: N, 3.25; Br, 17.74.

EXAMPLE 6

(a) *β-(1-octamethylenimino)ethyl benzilate hydrochloride*

β-(1-octamethylenimino)ethyl chloride (prepared from 11.3 g. of the chloride hydrochloride, in turn prepared from octamethylenimine by a method analogous to that described in Example 1, parts (a) and (b)) was dissolved in ether and added dropwise to a stirred, refluxing solution of 12.5 g. of benzilic acid in 50 cc. of isopropyl alcohol. The ether was allowed to escape through the top of the condenser. After the mixture had been stirred and refluxed for twelve hours it was filtered. Dry ether was added to the warm filtrate until it became cloudy. A copious precipitate was obtained, giving 17.2 g. of β-(1-octamethylenimino)ethyl benzilate hydrochloride, M. P. 165–166.5° C. after recrystallization from an ethanol-isopropyl alcohol-ether mixture.

*Anal.*—Calcd. for $C_{24}H_{31}NO_3.HCl$: C, 68.96; H, 7.72; N, 3.35; Cl, 8.48. Found: C, 68.97; H, 7.74; N, 3.35; Cl, 8.32.

(b) *β-(1 - octamethylenimino)ethyl benzilate methobromide* was obtained by treating a solution of β-(1-octamethylenimino)ethyl benzilate (obtained from the hydrochloride salt by treatment with alkali) dissolved in a mixture of methyl ethyl ketone and ether with an excess of methyl bromide. After standing for seven days the precipitated methobromide was collected and recrystallized from butanol and had the M. P. 179–180° C. (dec.).

*Anal.*—Calcd. for $C_{25}H_{34}NO_3Br$: C, 63.02; H, 7.19; Br, 16.77. Found: C, 62.91; H, 7.40; Br, 17.81.

I claim:

1. A compound selected from the group consisting of basic esters having the formula

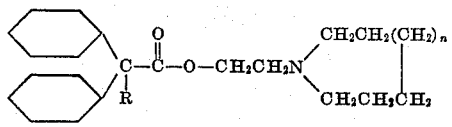

wherein R is selected from the group consisting of hydrogen and hydroxy, and $n$ is an integer from 1 to 3; and water-soluble, non-toxic salts thereof.

2. A water-soluble, non-toxic salt of β-(1-hexamethylenimino)ethyl diphenylacetate.

3. A water-soluble, non-toxic salt of β-(1-hexamethylenimino)ethyl benzilate.

4. A water-soluble, non-toxic salt of β-(1-heptamethylenimino)ethyl diphenylacetate.

5. A water-soluble, non-toxic salt of β-(1-heptamethylenimino)ethyl benzilate.

6. A water-soluble, non-toxic salt of β-(1-octamethylenimino)ethyl benzilate.

7. β-(1-hexamethylenimino)ethyl diphenylacetate hydrochloride.

8. β-(1-hexamethylenimino)ethyl benzilate hydrochloride.

9. β-(1-heptamethylenimino)ethyl diphenylacetate hydrochloride.

10. β-(1-heptamethylenimino)ethyl benzilate hydrochloride.

11. β-(1-octamethylenimino)ethyl benzilate hydrochloride.

12. In the process for the preparation of a compound having the formula

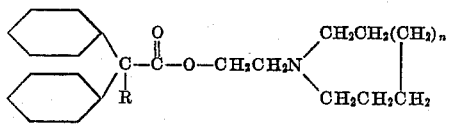

wherein R is selected from the group consisting of hydrogen and hydroxy, $n$ is an integer from 1 to 3; the step which comprises heating a compound having the formula

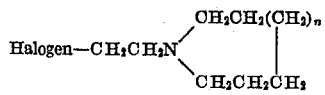

with a member of the group consisting of an acid having the formula $(C_6H_5)_2$—CR—COOH and metallic salts thereof.

13. The process for the preparation of a hydrohalide of a compound having the formula

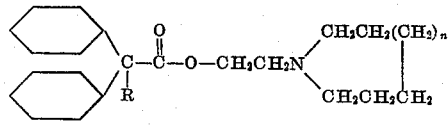

wherein R is hydrogen and $n$ is an integer from 1 to 3, which comprises heating a compound having the formula

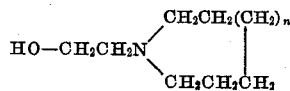

with a diphenylacetyl halide.

References Cited in the file of this patent

Blicke et al.: J. Am. Chem. Soc., vol. 64, pp. 428–31 (1942).